US008450399B2

(12) United States Patent
Omeis et al.

(10) Patent No.: US 8,450,399 B2
(45) Date of Patent: May 28, 2013

(54) POLYMER COMPOSITION COMPRISING PHENOLIC RESIN

(75) Inventors: Marianne Omeis, Dorsten (DE); Frank Bauer, Iserlohn (DE); Elke Fiebig-Bauer, legal representative, Iserlohn (DE); Kathrin Salwiczek, Marl (DE)

(73) Assignee: Evonik Degussa GmbH, Essen (DE)

( * ) Notice: Subject to any disclaimer, the term of this patent is extended or adjusted under 35 U.S.C. 154(b) by 129 days.

(21) Appl. No.: 12/990,371

(22) PCT Filed: Apr. 2, 2009

(86) PCT No.: PCT/EP2009/053938
§ 371 (c)(1),
(2), (4) Date: Jan. 10, 2011

(87) PCT Pub. No.: WO2009/132924
PCT Pub. Date: Nov. 5, 2009

(65) Prior Publication Data
US 2011/0152411 A1 Jun. 23, 2011

(30) Foreign Application Priority Data
Apr. 30, 2008 (DE) .......................... 10 2008 001 475

(51) Int. Cl.
| | | |
|---|---|---|
| C08K 5/34 | (2006.01) | |
| C08K 5/35 | (2006.01) | |
| C08K 5/3435 | (2006.01) | |
| C08K 5/3492 | (2006.01) | |
| C08K 5/353 | (2006.01) | |
| C08K 5/357 | (2006.01) | |

(52) U.S. Cl.
USPC ................. 524/96; 524/97; 524/99; 524/100; 524/102; 525/474; 525/534

(58) Field of Classification Search
USPC ................. 524/96, 97, 99, 100, 102; 525/474, 525/534
See application file for complete search history.

(56) References Cited

U.S. PATENT DOCUMENTS

| | | |
|---|---|---|
| 4,699,970 A | 10/1987 | Tiba et al. |
| 4,806,267 A | 2/1989 | Culbertson et al. |
| 4,839,446 A | 6/1989 | Culbertson et al. |
| 5,302,687 A | 4/1994 | Culbertson et al. |
| 5,616,659 A | 4/1997 | Deviney et al. |
| 5,644,006 A | 7/1997 | Deviney et al. |
| 5,844,026 A | 12/1998 | Galbo et al. |
| 5,962,683 A | 10/1999 | Steinmann et al. |
| 6,610,765 B1 | 8/2003 | Pfaendner et al. |
| 2008/0207838 A1 | 8/2008 | Omeis et al. |
| 2010/0076186 A1 | 3/2010 | Kuebelbaeck et al. |

FOREIGN PATENT DOCUMENTS

| | | |
|---|---|---|
| EP | 0 284 880 | 10/1988 |
| EP | 0 389 419 | 9/1990 |
| EP | 0 816 346 | 1/1998 |
| EP | 0 758 351 | 10/1998 |
| RU | 2066682 | 9/1996 |
| RU | 2230758 | 6/2004 |
| RU | 2251562 | 5/2005 |
| WO | 94 14867 | 7/1994 |
| WO | 98 05699 | 2/1998 |
| WO | 2005 047384 | 5/2005 |
| WO | WO 2010/034562 A1 | 4/2010 |

OTHER PUBLICATIONS

Boulter, E. A. et al., "High-Service Temperature Polyether Amide Thermoset Resins—New Materials for Electrical Insulation and High Strength Composites", In Electrical Insulation Conference and Electrical Manufacturing & Coil Winding Conference Proceedings, vol. 22-25, pp. 249-253, (Sep. 1997).
Technological Advances, "New Cost Competitive Thermoset Resins for Advanced Composite Applications have Properties Superior or Equal to High Performance Epoxies", MAT TECH 11.6:215-229, pp. 215-219 (1996).
Culbertson, B. M., "Cyclic Imino Ethers in Step-Growth Polymerizations", Progress in Polymer Science, vol. 27, pp. 579-626, (2002).
International Search Report issued Jun. 24, 2009 in PCT/EP09/053938 filed Apr. 2, 2009.
U.S. Appl. No. 12/990,421, filed Oct. 29, 2010, Omeis, et al.
Office Action issued Aug. 28, 2012, in Russian Patent Application No. 2010 148 304 filed Apr. 2, 2009.

*Primary Examiner* — Kriellion Sanders
(74) *Attorney, Agent, or Firm* — Oblon, Spivak, McClelland, Maier & Neustadt, L.L.P.

(57) ABSTRACT

The invention relates to a polymer composition which is characterized in that it comprises a mixture (A) consisting of formula (A1) and/or formula (A2), phenolic resin (B) and a stabilizer (C) in the form of a HALS compound.

17 Claims, No Drawings

POLYMER COMPOSITION COMPRISING PHENOLIC RESIN

The present invention describes a polymer composition comprising phenolic resin.

In Electrical Insulation Conference, 1997, and Electrical Manufacturing & Coil Winding Conference Proceedings, Volume 22-25 (September 1997), pages 249-253 E. A. Boulter et al describe the properties of oxazoline-modified phenolic resins, for example the adhesion to carbon fibres, glass fibres and metals, the resistance to thermooxidative degradation, the low smoke evolution in the case of fire, the low flammability and the high impact toughness. Particularly as a result of the low flammability, these polymers are suitable for producing components for the aircraft industry. Further applications are in the field of electrical insulation and in the electronics sector. According to E. A. Boulter, these precursors or prepolymers are also suitable, inter alia, for injection moulding, resin transfer moulding (RTM) and prepregs.

A batch process for preparing oxazoline-modified phenolic resins is described by Tiba et al. in U.S. Pat. No. 4,699,970. Here, oxazolines and phenolic resins are reacted in the presence of phosphites as catalysts and subsequently cured. The use of phosphines as catalysts is described by Goel et al. in EP 0 284 880 A2.

A further batch process for preparing oxazoline-modified phenolic resins is described by Culbertson et al. in U.S. Pat. No. 5,302,687. Catalysts described here are tetraalkylammonium and tetraarylammonium salts and tetraalkylphosphonium and tetraarylphosphonium salts, with alkyl halides being used as cocatalysts.

In U.S. Pat. No. 4,806,267, Culbertson et al. likewise describe a process for preparing a low-melting mixture (a melting point of less than 100° C.) comprising aromatic bisoxazolines and bisoxazines, with the structural unit of the oxazolines or oxazines being present in one molecule. In U.S. Pat. No. 5,644,006, Deviney et al. describe the reaction of a phenolic resin with modified bisoxazolines.

In Prog. Polym. Sci. 27 (2002) 579-626, Culbertson describes the stepwise polymerization of cyclic imino ethers, including the reaction of oxazolines with phenol-containing compounds. Here too, a batch process is described.

The properties of polymers prepared from bisoxazolines and phenolic resins are described in the publication Mat. Tech. 11.6:215-229.

EP 0 758 351 B1 describes compositions which are composed of oxazolines and contain an organometallic compound as initiator and can be polymerized by means of energy, and homopolymers and copolymers of oxazolines. These compositions can preferably comprise phenolic compounds having two or more phenolic hydroxy groups.

In U.S. Pat. No. 5,616,659, Deviney et al. describe a novolak crosslinked by means of bisoxazolines, with phosphoric ester groups being bound to the polymer chain in order to improve the flame resistance of the polymer.

To increase the thermooxidative stability, Deviney et al. describe, in WO 98/05699, the preparation of a polymer from a phenolic resin and bisoxazolines in the absence of a catalyst. To achieve uniform introduction of energy into the composition composed of phenolic resin and bisoxazoline, the composition is exposed to an electromagnetic field.

It was an object of the present invention to provide a polymer composition which comprises phenolic resin and is suitable for producing materials having an improved thermooxidative stability.

It has surprisingly been found that a polymer composition which comprises phenolic resin and stabilizers, especially in the form of HALSs, is suitable for providing both reactive polymers and materials having an improved long-term stability. The addition of HALSs can suppress embrittlement caused by action of light and heat on the materials produced from the polymer composition according to the invention. In this way, a virtually constant tensile elongation and elongation at break of these materials can be achieved.

The polymer composition of the invention can, for example, be employed for preparing, by means of an extruder, a reactive polymer which can subsequently be used further for producing composites. Furthermore, this polymer composition can also be converted into a material in a batch process according to the prior art.

The invention provides a polymer composition, characterized in that this polymer composition comprises
a mixture (A) comprising
one or more compounds having the structure (A1)

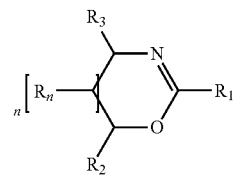

(A1)

where $R_1$=alkyl or phenyl group,
$R_2$, $R_3$, $R_n$=hydrogen, alkyl group,
n=0, 1, 2, 3,
or
one or more compounds having the structure (A2)

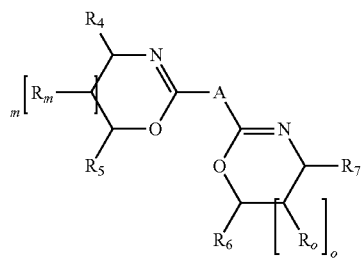

(A2)

where A=alkylene or phenylene,
$R_4$, $R_5$, $R_6$, $R_7$, $R_m$, $R_o$=hydrogen, alkyl group,
m, o=0, 1, 2, 3,
or mixtures of one or more compounds having the structure (A1) and (A2),
where the substituents of the type $R_1$, $R_2$, $R_3$, $R_4$, $R_5$, $R_6$, $R_7$, $R_n$, $R_m$ and $R_o$ can be identical or different and substituted or unsubstituted, the structural fragment A can be substituted or unsubstituted and m and o can be identical or different,
at least one phenolic resin (B) and
at least one stabilizer (C) selected from among 2,2,6,6-tetramethylpiperidin-4-one and/or derivatives thereof.

The polymer composition of the invention preferably contains at least 5% by weight of chemically unbound compounds having the structure (A1) and/or (A2), based on the polymer composition. The expression "chemically unbound compounds" means that the compounds having the structure (A1) and/or (A2) have not reacted with the phenolic resin and are thus present in free form in the polymer composition of the invention.

The proportion of chemically unbound compounds having the structure (A1) and/or (A2) is determined as follows (for example for 1,3-phenylenebisoxazoline):

15 g of the sample (polymer composition, for example as described in Example 1) are placed in an extraction thimble and extracted with methanol under reflux for 18 hours. 1 ml of this methanolic solution is admixed with 10 ml of acetonitrile and 1 ml of HMDS (hexamethyldisilazane) to form the derivative and heated at 100° C. for 1 hour. The sample is subsequently analysed by gas chromatography to determine the percent by area of 1,3-phenylenebisoxazoline.

To convert percent by area into percent by weight, 1,3-phenylenebisoxazoline (purity: 99.8%) is used for calibration in the following manner:

168.5 mg of 1,3-phenylenebisoxazoline (purity: 99.8%) is admixed with 10 ml of acetonitrile and 1 ml of HMDS, heated at 100° C. for 1 hour and subsequently likewise analysed by gas chromatography.

The content of free 1,3-phenylenebisoxazoline in the polymer composition can be calculated from the percent by area values of the extracted sample and of the sample treated as standard, taking into account the weights used.

The content of chemically unbound compounds having the structure (A1) and/or (A2) in the polymer composition of the invention is preferably at least 5% by weight, more preferably from 8 to 40% by weight, particularly preferably from 10 to 35% by weight, based on the polymer composition.

The polymer composition of the invention can be processed in a simple manner to give a granular material which can readily be handled in industry and also has a good homogeneity. Furthermore, the rapid curing of the polymer composition of the invention is advantageous. This polymer composition is particularly suitable for producing materials which display a high heat distortion resistance, a glass transition temperature above 190° C. and extraordinary impact properties. The polymer composition of the invention can be used both for producing commodity components and also for producing high-performance fibre composites. Thus, the materials produced from the polymer composition of the invention have a high toughness and resilience, improved electrical properties and low to nonexistent liberation of reaction products, especially compared to materials made of phenolic resins according to the prior art. Furthermore, these materials display good properties in respect of the international "Fire, Smoke and Toxicity" (FST) regulations.

Important constituents of the polymer composition of the invention are the compounds of the structures (A1) and (A2) which can be used either alone or in the form of a mixture. Of course, it is also possible to use mixtures of different compounds of the structure (A1) or (A2). The substituents $R_1$ to $R_7$ and $R_n$ to $R_o$ encompass hydrogen and/or alkyl groups, with alkyl groups being, for the purposes of the present invention, linear or branched, aliphatic or cycloaliphatic groups having from 1 to 6 carbon atoms. The alkyl groups are preferably linear aliphatic groups having from 1 to 6 carbon atoms, in particular methyl, ethyl, propyl, butyl groups.

The polymer composition of the invention preferably comprises compounds having the structures (A1) and/or (A2) in which the substituents of the type $R_1$, $R_2$, $R_3$, $R_4$, $R_5$, $R_6$, $R_7$, $R_n$, $R_m$ and $R_o$ are hydrogen and/or unsubstituted alkyl groups having from 1 to 6 carbon atoms and the structural fragment A is unsubstituted alkylene having from 1 to 6 carbon atoms or unsubstituted phenylene in the mixture (A). This probably comprises compounds having the structures (A1) and/or (A2) in which n, m, o=0 or 1. An example of an above-mentioned compound (A1) is 2-ethyl-2-oxazoline.

In a preferred embodiment of the polymer composition of the invention, this comprises a mixture (A) consisting of 100% by weight of one or more compounds having the structure (A2) in which m and o are preferably 0 or 1. In particular, it comprises compounds having the structure (A2) which have a phenylene group as structural fragment A, for example 1,3-phenylenebisoxazoline or 1,4-phenylenebisoxazoline. The polymer composition of the invention can comprise a mixture (A) comprising compounds having the structure (A2) in which m≠o within the same compound (A2u) and/or compounds having the structure (A2) in which m=o within the same compound (A2g). Thus, the polymer composition of the invention can comprise, for example, a mixture (A) which comprises only compounds having m=1 and o=0 within the same compound (A2g). Examples of the abovementioned compounds of the structure (A2) are 1,3-phenylenebisoxazoline and 1,4-phenylenebisoxazoline.

However, it is advantageous for the polymer composition of the invention to comprise a mixture (A) comprising both compounds having the structure (A2) in which m and o=1 within the same compound (A2g6) and compounds having the structure (A2) in which m and o=0 within the same compound (A2g5). As compounds having the structure (A2g5), the polymer composition of the invention preferably comprises 1,3-phenylenebisoxazoline or 1,4-phenylenebisoxazoline.

The polymer composition of the invention preferably comprises a mixture (A) comprising
  from 10 to 90% by weight of compounds of the structure (A2g6) and
  from 90 to 10% by weight of compounds of the structure (A2g5),
particularly preferably
  from 30 to 70% by weight of compounds of the structure (A2g6) and
  from 70 to 30% by weight of compounds of the structure (A2g5)
and very particularly preferably
  from 45 to 55% by weight of compounds of the structure (A2g6) and
  from 55 to 45% by weight of compounds of the structure (A2g5).

The polymer composition of the invention preferably comprises phenolic resins (B) which are obtained by condensation of phenols with aldehydes, in particular formaldehyde. Thus, the polymer composition of the invention can comprise phenolic resins selected from among the novolak and resol types. It particularly preferably comprises novolaks as phenolic resin (B). The phenolic resins (B) used preferably have a content of free formaldehyde of less than 0.1% by weight (determination in accordance with DIN EN 120). This has the advantage that no emissions of formaldehyde occur.

The polymer composition of the invention preferably comprises the mixture (A) and the phenolic resin (B) in a weight ratio of mixture (A) to phenolic resin (B) of from 99:1 to 1:99, more preferably from 90:10 to 10:90, particularly preferably from 75:25 to 25:75 and very particularly preferably from 45:55 to 55:45.

Furthermore, the polymer composition of the invention particularly preferably comprises HALSs (hindered amine light stabilizers), derivatives of 2,2,6,6-tetramethylpiperidin-4-one, as stabilizers (C). This has the advantage that the long-term stability of the reactive polymer can be improved thereby. The polymer composition of the invention can also comprise a mixture of various HALSs.

The polymer composition of the invention preferably comprises stabilizers having the structure (1)

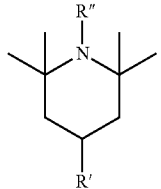
(1)

where R'=alkoxy group,

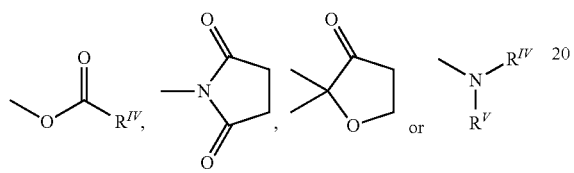

and

R''=free oxygen radical (—O•), hydrogen, alkyl or alkoxy group,

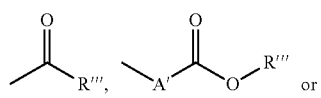

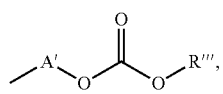

where R''' and $R^{IV}$=alkyl group, $R^{V}$=heterocycle and A'=alkylene group and the alkyl, alkoxy, alkylene groups and heterocycles are substituted or unsubstituted.

The polymer composition of the invention particularly preferably comprises stabilizers (C) having the following structures (2) to (4):

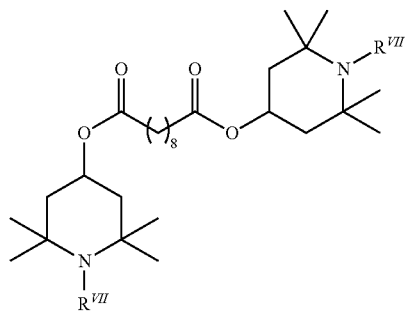
(2)

where $R^{VII}$=hydrogen, alkyl or alkoxy group,

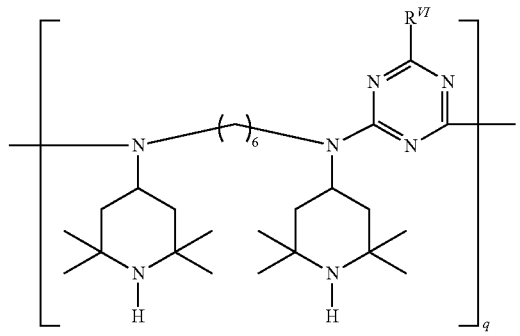
(3)

where

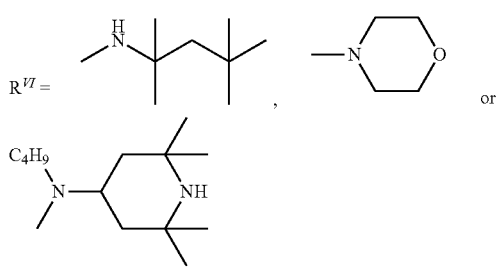

q=2 to 10, or

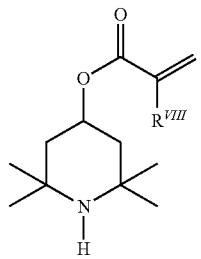
(4)

where $R^{VIII}$=hydrogen or alkyl group.

In a further embodiment of the polymer composition of the invention, this comprises polymer-bound HALSs such as

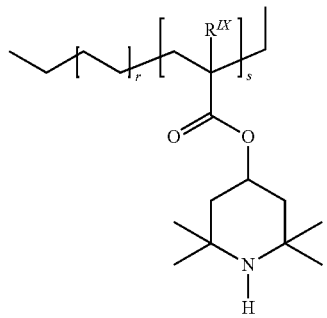
(5)

where $R^{IX}$=hydrogen or alkyl group and r, s≧10.

These polymer-bound HALSs are 2,2,6,6-tetramethylpiperidin-4-one derivatives bound to or in a polymer chain. Suitable polymer chains are functionalized polyolefins, in particular copolymers based on ethylene and esters of (meth) acrylic acid and very particularly preferably copolymers based on ethylene and methacrylate. Particularly useful examples of polymer-bound HALSs are disclosed in EP 0 063 544 A1, whose contents are incorporated by reference into the present invention.

In particular, the polymer composition of the invention contains the stabilizers (C) in an amount of from 0.1 to 2% by weight, preferably from 0.2 to 1.5% by weight and particularly preferably from 0.3 to 1.2% by weight, based on the polymer composition.

The polymer composition of the invention can also comprise Lewis acids or Lewis bases in addition to the components (A), (B) and (C). These compounds serve as catalyst in a later reaction. The polymer composition of the invention preferably comprises trialkyl or triaryl phosphites, preferably triphenyl phosphite.

In a particular embodiment of the polymer composition of the invention, this can also comprise tetraalkylphosphonium or tetraarylphosphonium salts, tetraalkylammonium or tetraarylammonium salts of halides, tetrafluoroborate, hexafluorophosphate or para-toluenesulphonic acid as catalysts.

These compounds, which can serve as catalyst in a later reaction, are preferably present in the polymer composition of the invention in an amount of from 0 to 2% by weight, based on the polymer composition, preferably in an amount of from 0.01 to 1% by weight and particularly preferably in an amount of from 0.01 to 0.4% by weight.

Depending on the use of the polymer composition of the invention, it can be advantageous for the polymer composition of the invention not to contain any catalyst. This is particularly the case for uses of the polymer composition of the invention for the production of materials in which the loss in mass during a thermal treatment should be as low as possible The polymer composition of the invention can further comprise antioxidants; it preferably comprises sterically hindered phenols, more preferably compounds having the structure (6),

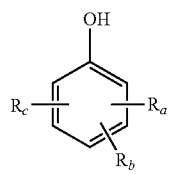

(6)

where $R_a$, $R_b$, $R_c$=hydrogen, alkyl, alkylaryl or cycloalkyl group, where the substituents of the type $R_a$, $R_b$, $R_c$ can be identical or different and substituted or unsubstituted, for example the reaction product of 4-methylphenol with dicyclopentadiene and isobutene having the structure (7),

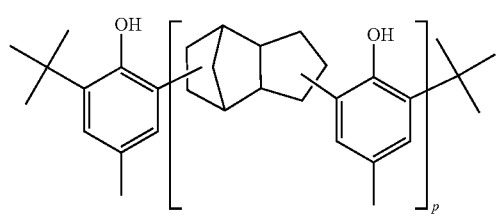

(7)

where p=1 to 5.

These antioxidants are preferably present in the polymer composition of the invention in an amount of from 0.1 to 2% by weight, preferably from 0.2 to 1.5% by weight and particularly preferably from 0.3 to 1.2% by weight, based on the polymer composition.

It is advantageous for the polymer composition of the invention to comprise at least one deaerator. As deaerator, it can comprise, for example, silicone oils or silicone-modified polyglycols and polyethers, foam-destroying polysiloxanes or polymers, polyether-modified polymethylalkylsiloxanes as are marketed, for example, by Byk under the trade name Byk®A 506, Byk®-A 525, Byk®-A 530 or Byk®-A 535. The addition of a deaerator has the advantage that bubble formation in the material produced therefrom later can be significantly reduced. The polymer composition of the invention preferably contains the deaerator in an amount of from 0.1 to 1% by weight, based on the polymer composition, more preferably from 0.2 to 0.8% by weight and particularly preferably from 0.3 to 0.7% by weight.

A possible use of the polymer composition of the invention is, for example, the production of foams, and for this purpose it is advantageous for the polymer composition of the invention to comprise blowing agents instead of the deaerator. As blowing agents, the polymer composition of the invention can preferably comprise organic solvents, more preferably methanol. The blowing agent is preferably present in the polymer composition of the invention in an amount of from 0.5 to 5% by weight, based on the polymer composition.

It is also advantageous for the polymer composition of the invention to comprise at least one mould release agent, which makes the polymer composition easier to handle in shaping processes. The polymer composition of the invention preferably comprises mould release agents selected from among silicones, for example in the form of oils, oil-in-water emulsions, fats and resins, waxes, for example natural and synthetic paraffins with and without functional groups, metal soaps or metal salts of fatty acids, for example calcium, lead, magnesium, aluminium and/or zinc stearate, fats, polymers, for example polyvinyl alcohol, polyesters and polyolefins, monoesters of phosphoric acid, fluorinated hydrocarbons and/or inorganic mould release agents, for example graphite, talc and mica powder.

As mould release agents, the polymer composition of the invention preferably comprises internal mould release agent systems which are added to the starting materials and can, especially during the shaping process, either accumulate at the surface of the moulding or can bring about more rapid curing of the surface so that no bond can be formed between the wall of the mould and the moulding. In particular, the polymer composition of the invention comprises mould release agents from Acmos Chemie KG which are marketed under the trade names ACMOSAL® 82-837, ACMOSAL® 82-847, ACMOSAL® 82-860, ACMOSAL® 82-866, ACMOSAL® 82-9018, ACMOSAL® 82-853. The mould release agent is particularly preferably present in the polymer composition of the invention in an amount of from 0.1 to 2% by weight, very particularly preferably from 0.2 to 1.5% by weight, based on the polymer composition.

Furthermore, the polymer composition of the invention can also comprise wetting agents, preferably surfactants, more preferably ethoxylated fatty alcohols or sodium laurylsulphate, preferably in an amount of from 0.1 to 2% by weight, based on the polymer composition.

Furthermore, the polymer composition of the invention can also comprise flame retardants, for example halogenated organic compounds or organic phosphorus compounds. It preferably comprises organic phosphorus compounds, in particular diphenyl cresyl phosphate, or ammonium polyphosphates. The flame retardant is preferably present in an amount of from 1 to 30% by weight, more preferably from 2 to 15% by weight and particularly preferably from 5 to 10% by weight, based on the polymer composition. It preferably comprises a flame retardant from Clariant, as marketed under the trade names Exolit® AP, in particular Exolit® 263, Exolit® 442, Exolit® 454, Exolit® 455, Exolit® 470, Exolit® AP 420, Exolit® AP 422, Exolit® AP 423, Exolit® AP 462, Exolit® AP 740, Exolit® AP 751, Exolit® AP 760.

The polymer composition of the invention can comprise, in addition to the additives mentioned above, further additives or particulate components, for example:

thixotropes, for example pyrogenic silicas, preferably Aerosils, fillers and pigments, for example titanium dioxide, nanoparticles, for example sheet silicates, in particular sodium lithium magnesium silicates as are marketed, for example, by Rockwood under the trade name Laponite® S482, coupling reagents, for example silanes, preferably N-cycloalkylaminoalkylalkyl-dialkoxysilanes, preferably N-cyclohexylaminomethylmethyldiethoxysilane, marketed under the trade name Geniosil® XL 924 by Wacker Chemie AG, flexibilizers, for example glycols, low profile additives, for example thermoplastics, preferably polyvinyl acetates as are marketed by Wacker Chemie AG under the trade name Vinnapas® B 60 sp, additives for increasing the electrical conductivity, for example calcium silicate, photoinitiators, preferably α-hydroxyketones, more preferably 2-hydroxy-2-methyl-1-propan-1-one, particularly preferably Darocure® 1173 from Ciba, light-absorbing additives, preferably 2,4-bis(2,4-dimethylphenyl)-6-(2-hydroxy-4-isooctyloxyphenyl)-1,3,5-triazines, for example CYASORB® UV-1164L from Cytec Industries Inc. and/or antistatics.

In a further preferred embodiment, the polymer composition of the invention additionally comprises a reactive diluent. This usually comprises low molecular weight, ethylenically unsaturated compounds to lower the viscosity. In general, these are acrylate- or methacrylate-containing materials which are liquid at room temperature and are thus able to reduce the total viscosity of the formulation. Examples of such products are, in particular, isobornyl acrylate, hydroxypropyl methacrylate, trimethylolpropane formal monoacrylate, tetrahydrofurfuryl acrylate, phenoxyethyl acrylate, trimethylenepropane triacrylate, dipropylene glycol diacrylate, tripropylene glycol diacrylate, hexanediol diacrylate, pentaerythrityl tetraacrylate, lauryl acrylate and also propoxylated or ethoxylated variants of these reactive diluents and/or urethanized reactive diluents such as EBECRYL® 1039 (Cytec) and others. Further possibilities are other liquid components which are able to react under conditions of free-radical polymerization, e.g. vinyl ether or allyl ether. As an alternative, it is possible to use epoxy resins as reactive diluents. The reactive diluents used according to the present invention are preferably Araldit® LY 1135-1 A resin (epoxy resin from Huntsman Advanced Materials (Europe) BVBA). The proportion of reactive diluents is from 0.1 to 20% by weight, preferably from 1 to 5% by weight, based on the polymer composition of the invention. The addition of the reactive diluents enables the viscosity of the polymer composition to be adjusted, preferably reduced.

In a particularly preferred embodiment of the polymer composition of the invention, this comprises at least one deaerator and at least one mould release agent.

The polymer compositions according to the invention can be prepared in all ways known to those skilled in the art. Thus, they can be prepared by batch processes as are described, for example, by Culbertson et al. in U.S. Pat. No. 5,302,687.

In the case of the batch processes, the starting components are, in the simplest case, reacted in a suitable reaction vessel, in particular under the action of heat. Thus, the reaction temperature is, in particular, from 140 to 180° C., preferably from 160 to 170° C. The reaction time can be varied freely and is, in particular, from 5 to 20 minutes, preferably from 10 to 15 minutes. The addition of the components to be mixed can be selected freely, in particular the order of phenolic resin (B) and mixture (A).

As an alternative, the polymer compositions of the invention can also be prepared by continuous processes, for example continuously in an extruder, flow tube, intensive kneader, intensive mixer or static mixer. The reaction parameters can be selected essentially freely; in particular, the preparation of the polymer compositions of the invention in the apparatuses mentioned is effected by intensive mixing and quick reaction, preferably with introduction of heat. Intensive mixing and quick reaction with introduction of heat means that the residence time of the starting materials in the abovementioned apparatuses is usually from 3 seconds to 15 minutes, preferably from 3 seconds to 5 minutes, particularly preferably from 5 to 180 seconds. The reactants are preferably reacted at temperatures of from 100° C. to 275° C., more preferably from 150° C. to 200° C., very particularly preferably from 170° C. to 190° C. However, depending on the type of starting materials and end products, these values for residence time and temperature can also be in other preferred ranges.

If appropriate, a continuous after-reaction can follow. Subsequent, preferably rapid, cooling then enables the end product to be obtained. For the purposes of the present invention, rapid cooling means that the temperature decreases by more than 50° C. within less than 60 seconds. The melt is, for example, conveyed away at an exit temperature of 120° C. by means of, for example, a water- or air-cooled metal belt. The temperature of the cooling belt is preferably from 0 to 23° C., more preferably room temperature. Rapid cooling has the advantage that after-reactions in the polymer melt are suppressed thereby and, in addition, granulation is possible.

As apparatuses, extruders such as single-screw or multiscrew extruders, in particular twin-screw extruders, planetary gear extruders or ring extruders, flow tubes, intensive kneaders, intensive mixers such as Turrax mixers or static mixers are particularly suitable for the preferred preparative process and are preferably used. In a particular embodiment of the preparative process, it is also possible to use multishaft extruders such as ring extruders. Particular preference is given to multiscrew extruders, in particular twin-screw extruders, and multishaft extruders, in particular ring extruders. Very particular preference is given to twin-screw extruders.

It is surprising that the reaction which in a batch process requires up to one hour proceeds within a few seconds in the abovementioned apparatuses, for example in an extruder or intensive kneader. The brief thermal stress in combination with the mixing action of the extruder is sufficient for the reactants to be completely or largely reacted to the desired degree in the preparative process. When the mixing chambers are appropriately equipped or the screw geometries are configured appropriately, the extruders or intensive kneaders allow intensive rapid mixing with simultaneous intensive heat transfer. In addition, uniform flow in the longitudinal direction with a very uniform residence time is ensured. Furthermore, it is advantageous when different temperatures are possible in the individual barrels or sections of the apparatus.

Further advantages of the continuous preparative process are, apart from the good mixing by means of the extruder, precise metering of the components and the ability for the reaction time to be set precisely. In this way, a polymer composition which can be processed significantly more simply than a polymer composition prepared by means of a batch process is obtained. Furthermore, the preferred continuous preparative process is an economically attractive process since, inter alia, it is a continuous process in which the process parameters can be defined precisely. A scale-up process should therefore be relatively simple.

The starting materials are generally fed into the apparatuses in separate feed streams. In the case of more than two feed streams, these can also be bundled together for feeding in. Hydroxyl-containing amorphous and/or crystalline polymers can be combined to form one feed stream. It is also possible to add catalysts and/or additives such as levelling agents, stabilizers, flame retardants, deaerators or bonding agents to this feed stream. The streams can also be divided and in this way be fed in different proportions to various places on the apparatuses. This enables concentration gradients to be set in a targeted manner, as a result of which the reaction can be brought to completion. The points of introduction of the feed streams can generally be varied in terms of the order and the introduction can be offset in time.

To carry out a prereaction and/or to complete the reaction, a plurality of apparatuses can also be combined.

The cooling following the reaction is, as described above, preferably carried out rapidly and can be integrated into the reaction section in the form of a multibarrel embodiment as in the case of extruders or Conterna machines. It is also possible to use: shell-and-tube apparatuses, tube coils, cooling rollers, air conveyors and transport belts made of metal.

For conversion into the finished form, the polymer composition leaving the apparatus or the after-reaction zone can, depending on the viscosity, firstly be brought to a suitable temperature by further cooling by means of appropriate abovementioned equipment. This is preferably followed by pelletization or comminution to a desired particle size by means of roller crushers, pin mills, hammer mills, flaking rollers or the like.

The present invention further provides for the use of the polymer composition of the invention for producing materials, in particular composites, particularly preferably fibre composites. Apart from the use for producing composites, the polymer composition of the invention can also be used for producing plastics. The plastics produced in this way preferably have a glass transition temperature $T_g$ of at least 190° C. and preferably at least 200° C.; these materials are preferably formaldehyde-free.

Depending on the type of use, the polymer composition of the invention can firstly be dissolved in commercial solvents, in particular ketones.

In the use according to the invention of the above-described polymer composition, it is possible to employ inorganic reinforcing fibres such as glass fibres, organic reinforcing fibres such as aramid fibres or carbon fibres, metallic reinforcing fibres or natural fibres. The reinforcing fibres can be used in the form of woven fabrics, lay-ups, multiaxial lay-ups, non-wovens, knitteds, braids or mats.

The above-described polymer composition is employed as matrix in the use according to the invention. Thus, this polymer composition can be used, for example, for producing preimpregnated semifinished parts such as sheet moulding compound (SMC) or bulk moulding compound (BMC). Preforming can likewise be used for producing the semifinished part in the use according to the invention.

The processing of this polymer composition with reinforcing materials to produce composites can be carried out by means of many processes/technologies according to the prior art. In particular, the composite is produced by means of one of the technologies listed below:
lamination, including manual lamination,
prepreg technology,
resin transfer moulding (RTM),
infusion processes such as resin infusion moulding (RIM) or the Seeman composites resin infusion process (SCRIMP),
winding processes,
pultrusion processes or
fibre laying processes.

The curing of this polymer composition in the use according to the invention can be effected by introduction of heat, for example in an oven, in an autoclave or in a press, or else by means of microwaves.

The composites produced by means of the use according to the invention can be employed, in particular, in the aircraft industry, in the transport industry, for example the automobile industry, and in the electrics industry. These composites can also be used in wind power plants, pipes or containers in the form of tanks or pressure vessels.

The polymer composition can also be used for producing lightweight structures, in particular in combination with multilayer structures such as honeycombs or foams based on phenolic resin, polyimide, glass, polyurethane, polyamide or polyvinyl chloride.

The use of the polymer composition in materials leads, in particular, to components having a high heat distortion resistance and a high glass transition temperature $T_g$. The high toughness and resilience of this polymer composition, which leads to improved impact properties, is also advantageous.

Further fields of use for the polymer composition or the materials resulting therefrom are, for example, as abrasive, refractory products, in the foundry industry, as battery separators, in pressure moulding and injection moulding, mineral wool (composed of, inter alia, glass, rock or basalt (formaldehyde-free)), for paper impregnation, in laminates based on glass or paper for electrical insulation, for the production of foams, coatings on glass or metal, for example as cable protection, rubber mixtures as replacement for novolak as separate phase and coreactants with other thermosets, for example bismaleimide.

The following examples illustrate the polymer composition of the invention without the invention being restricted to this embodiment.

EXAMPLE 1

Two streams were employed. Stream 1 consisted of a mixture of 50.7% by weight of a phenolic resin (Durez® 33100 from Sumitomo-Bakelite) and 49.3% by weight of 1,3-phenylene-bisoxazoline and stream 2 consisted of triphenyl phosphite (0.98% by weight of triphenyl phosphite based on the total formulation).

The extruder used, a twin-screw extruder model DSE25 (Brabender GmbH), comprised eight barrel sections which could be heated and cooled separately. Thus, the set temperature in barrel section 1 was 30° C., that in barrel section 2 was 100° C., that in barrel sections 3-7 was 180° C. and that in barrel section 8 and the head section was 160° C. The temperatures were regulated by means of electric heating or water cooling. The rotational speed of the screw was 280 rpm.

Stream 1 was fed as powder mixture in an amount of 3.00 kg/h into barrel section 1 of the extruder, while stream 2 was fed into barrel section 3 of the extruder in an amount of 29.6 g/h, with the stream being at room temperature.

The melt leaving the extruder was conveyed away by means of a cooling belt and subsequently milled.

Characterization is carried out on the solidified melt of the polymer composition:

Determination of the Glass Transition Temperature $T_g$

The glass transition temperature was determined by means of differential scanning calorimetry (DSC in accordance with DIN 53765); the conditioning of the sample was carried out as follows:

heating from room temperature to 150° C. and holding for one hour,
cooling to room temperature
heating to 250° C. and holding for two hours
cooling to room temperature
heating to 300° C.—without hold time Determination of the Hydroxyl Number The hydroxyl number is the amount of potassium hydroxide in milligrams which is equivalent to the amount of acetic acid bound in the acetylation of 1 g of substance.

Blank Determination (Duplicate Determination)

10 ml of acetylation solution (acetic anhydride—10% in tetrahydrofuran) and 30 ml of catalyst solution (4-N-dimethylaminopyridine—1% in tetrahydrofuran) are placed in a 100 ml conical flask, closed by means of a stopper and stirred at room temperature for 30 minutes. 3 ml of water are subsequently added and the mixture is stirred for another 30 minutes. This mixture is placed in the Titrino beaker and the conical flask is rinsed using about 4 ml of tetrahydrofuran, followed by titration (Titrino Basic 794 provided with an electrode of the type LL Solvotrode 6.0229.100 for nonaqueous media).

Hydroxyl Number Determination of the Sample

The sample (about 1 g) is weighed into a 100 ml conical flask and dissolved by means of 10 ml of acetylation solution while stirring over a period of about 5 minutes. 30 ml of catalyst solution are subsequently added and the mixture is stirred at room temperature for 30 minutes. 3 ml of deionized water are then added and the mixture is stirred for a further 30 minutes. This mixture is placed in the Titrino beaker and the conical flask is rinsed using about 4 ml of tetrahydrofuran, followed by titration of this sample. The equivalence point is about 200 mV in the case of the instrument used, with a plurality of end points being able to occur in the case of samples containing phenolic resins.

Calculation of the Hydroxyl Number $$\text{Hydroxyl number} = ((B-A) \times C \times 56.1)/W + AN$$

where A is the consumption of KOH solution (0.5N potassium hydroxide in ethanol) in the titration of the sample, in ml
B is the consumption of KOH solution in the blank, in ml
C is the concentration of the KOH solution in mol/l
W is the weight of sample in g
AN is the acid number of the sample in mg KOH/g Determination of the Acid Number by Separate Determination From 1.5 to 2 g are dissolved in 20 ml of dimethylformamide (DMF), admixed with 80 ml of isopropanol and subsequently titrated in accordance with DIN EN 12634.

The hydroxyl number is 249 mg KOH/g.

The viscosity was determined by means of a cone-and-plate viscometer (DIN 53019-1) and is 4365 mPas/160° C.

Characterization of the Cured Polymer Composition:

The glass transition temperature $T_g$ is 202° C. (DIN 53765).

EXAMPLE 2

The test specimens are produced using a matrix resin in combination with a woven carbon fibre fabric from ECC, Style 452 in accordance with ISO 1268 and the tensile test was carried out in accordance with DIN EN ISO 14129. Various polymer compositions are used as matrix resin:
(a) Polymer composition as described in Example 1
(b) Phenolic resin
(c) Cyanate ester resin
(d) Epoxy resin (Laminating resin Larit® L 305 from Lange+Ritter GmbH)

The polymer composition as described in Example 1 displays a higher tensile deformation compared to the prior art (samples (b) to (d)).

EXAMPLE 3

14.05 g of 1,2-phenylenebisoxazoline, 13.66 g of phenolic resin Durez® 33100 and 0.28 g of triphenyl phosphite are mixed at 164-167° C. and 50 rpm in a Brabender kneading chamber for 12 minutes. Part of the Brabender kneading output is conditioned in a reagent bottle in an oil bath for 4 h/250° C. (serves for curing of the polymer composition). This material is subsequently subjected to isothermal TGA (DIN 51006) for 4 h/360° C. The loss in mass is 27.6%.

EXAMPLE 4

14.0 g of 1,2-phenylenebisoxazoline, 13.6 g of phenolic resin Durez® 33100, 0.28 g of triphenyl phosphite, 0.07 g of RALOX® LC and 0.14 g of CYASORB® UV-3346 light stabilizer are mixed at 160° C. and 50 rpm in a Brabender kneading chamber for 7 minutes. Part of the Brabender kneading output is conditioned in a reagent bottle in an oil bath for 4 h/250° C. (serves for curing of the polymer composition). This material is subsequently subjected to isothermal TGA (DIN 51006) for 4 h/360° C. The loss in mass is 24.9%.

EXAMPLE 5

A polymer composition as described in Example 1 was prepared with addition of 0.5% by weight of CYASORB® UV-3346 light stabilizer and 0.25% by weight of RALOX® LC. Measurement of the viscosity (cone-and-plate viscometer in accordance with DIN 53019-1) after 300 s at 160° C. gave a value of 1808 mPas.

EXAMPLE 6

95 parts by weight of the polymer composition as described in Example 5 are mixed with 5 parts by weight of ARALDIT® LY 1135-1 A resin. Measurement of the viscosity (cone-and-plate viscometer in accordance with DIN 53019-1) after 300 s at 160° C. gave a value of 11 942 mPas. The processing viscosity can thus be influenced in a targeted manner by addition of epoxy resin.

The invention claimed is:
1. A polymer composition, comprising:
component (A) comprising at least one compound having structure (A2)

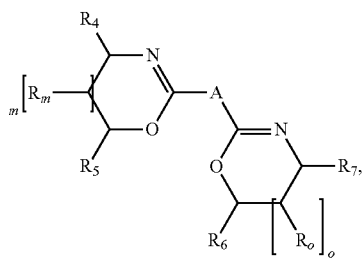
(A2)

wherein A=unsubstituted alkylene having from 1 to 6 carbon atoms or unsubstituted phenylene,
$R_4$, $R_5$, $R_6$, $R_7$, $R_m$, $R_o$=hydrogen, and/or unsubstituted alkyl groups having from 1 to 6 carbon atoms,
m, o=0, 1, 2, 3,
at least one phenolic resin (B);
at least one stabilizer (C) selected from the group consisting of compounds having structure (2)

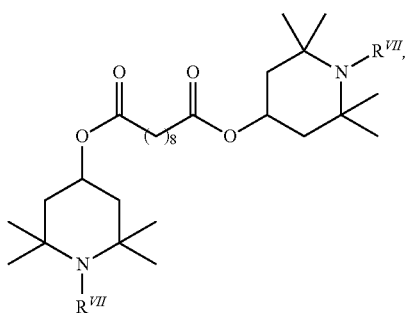
(2)

wherein $R^{VII}$=hydrogen, alkyl, or alkoxy group,
structure (3)

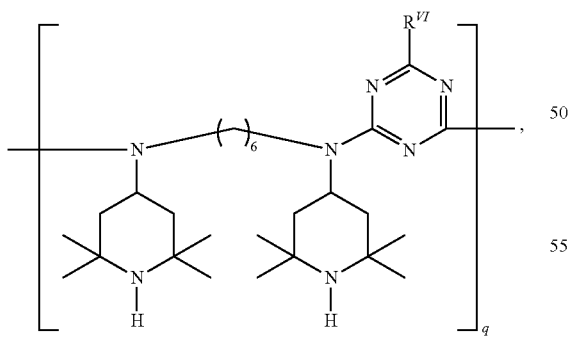
(3)

wherein $R^{VI}$=

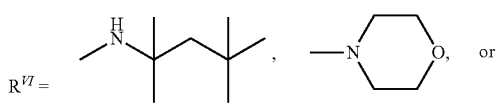

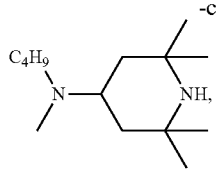

q=2 to 10,
structure (4)

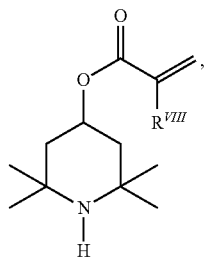
(4)

wherein $R^{VIII}$=hydrogen or alkyl group,
and
a polymer-bound HALS having structure (5)

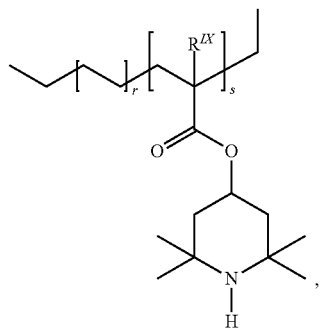
(5)

wherein $R^{ix}$=hydrogen or alkyl group, and
r, s≧10, and
an antioxidant having structure (7)

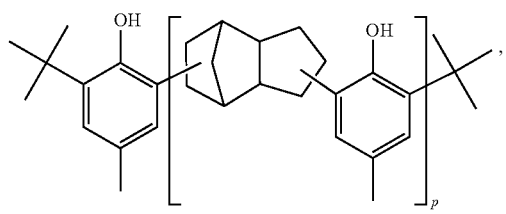
(7)

wherein p=1 to 5,
wherein in at least one compound having the structure (A2), m and o=0 (A2g5).
2. The polymer composition according to claim 1, wherein component (A) consists of 100% by weight of compounds having the structure (A2).

3. The polymer composition according to claim 2, wherein the component (A) comprises
   from 30 to 70% by weight of compounds of structure (A2g6) and
   from 70 to 30% by weight of compounds of structure (A2g5).

4. The polymer composition according to claim 1, wherein the stabilizer (C) is comprised in an amount of from 0.1 to 2% by weight based on a total weight of the polymer composition.

5. The polymer composition according to claim 1, further comprising at least one deaerator.

6. The polymer composition according to claim 5, wherein the at least one deaerator is selected from the group consisting of a silicone oil, a silicone-modified polyglycol, a silicone-modified polyether, a foam-destroying polysiloxane, a foam-destroying polymer, and a polyether-modified polymethylalkylsiloxane.

7. The polymer composition according to claim 1, further comprising at least one mold release agent.

8. The polymer composition according to claim 2, wherein the component (A) comprises
   from 45 to 55% by weight of compounds of structure (A2g6) and
   from 55 to 45% by weight of compounds of structure (A2g5).

9. The polymer composition according to claim 1, which comprises component (A) and phenolic resin (B) in a weight ratio of 99:1 to 1:99.

10. The polymer composition according to claim 9, wherein the weight ratio is 90:10 to 10:90.

11. The polymer composition according to claim 9, wherein the weight ratio is 75:25 to 25:75.

12. The polymer composition according to claim 9, wherein the weight ratio is 45:55 to 55:45.

13. The polymer composition according to claim 1, wherein phenolic resin (B) is novolak resin having a free formaldehyde content of less than 0.1% by weight.

14. The polymer composition according to claim 1, wherein component (A) is a mixture comprising the compound A2g5 and at least one other compound having the structure (A2).

15. The polymer composition according to claim 14, wherein in said at least one other compound having the structure (A2), m and o=1 (A2g6).

16. The polymer composition according to claim 1, wherein the stabilizer (C) comprises a compound having structure (3).

17. The polymer composition according to claim 15, wherein

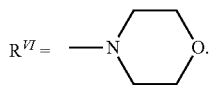

* * * * *